(12) United States Patent
Kearns et al.

(10) Patent No.: US 8,272,285 B2
(45) Date of Patent: Sep. 25, 2012

(54) FAILSAFE ACTUATOR

(75) Inventors: Keith Kearns, Shrewsbury (GB); David John Langford, Coven (GB); Timothy Hudson, Market Drayton (GB)

(73) Assignee: Goodrich Actuation Systems Limited, Solihull (GB)

( * ) Notice: Subject to any disclaimer, the term of this patent is extended or adjusted under 35 U.S.C. 154(b) by 434 days.

(21) Appl. No.: 12/417,368

(22) Filed: Apr. 2, 2009

(65) Prior Publication Data
US 2009/0250552 A1 Oct. 8, 2009

(30) Foreign Application Priority Data

Apr. 3, 2008 (GB) .................................. 0806025.3

(51) Int. Cl.
*F16H 3/06* (2006.01)
*F16H 29/20* (2006.01)
(52) U.S. Cl. ..................................... 74/89.37; 74/89.39
(58) Field of Classification Search ................ 74/89.23, 74/89.34, 89.36, 89.37, 89.38, 89.25, 89.26, 74/89.28, 89.39; 244/99.2, 102 A, 102 R, 244/102 SL
See application file for complete search history.

(56) References Cited

U.S. PATENT DOCUMENTS

| 2,476,376 | A | 7/1949 | Laraque | |
|---|---|---|---|---|
| 3,053,104 | A | 9/1962 | Scavini | |
| 7,533,590 | B2 * | 5/2009 | Cirio | 74/89.23 |
| 7,802,488 | B2 * | 9/2010 | Bucheton et al. | 74/89.23 |
| 2007/0220998 | A1 * | 9/2007 | Kopecek | 74/89.39 |
| 2008/0210029 | A1 * | 9/2008 | Wang | 74/89.38 |

FOREIGN PATENT DOCUMENTS

| EP | 1801007 | 6/2009 |
|---|---|---|
| GB | 927522 | 5/1963 |

OTHER PUBLICATIONS

European Search Report dated Jan. 19, 2011.

* cited by examiner

*Primary Examiner* — Thomas R Hannon
*Assistant Examiner* — Alan Waits
(74) *Attorney, Agent, or Firm* — Andrus, Sceales, Starke & Sawall, LLP

(57) ABSTRACT

An actuator comprises an actuator shaft mounted for rotation by a drive shaft, releasable lock means operable to restrict axial movement of the actuator shaft relative to the drive shaft, and an output member co-operating with the actuator shaft such that rotation of the actuator shaft drives the output member for translating movement relative to the actuator shaft.

13 Claims, 2 Drawing Sheets

FAILSAFE ACTUATOR

BACKGROUND

This invention relates to an actuator, and in particular to an actuator suitable for use in association with the landing gear of an aircraft, although the actuator may be used in other applications.

The landing gear of an aircraft is typically driven between its stowed and deployed positions by a primary actuator. The weight of the landing gear is sufficient that, during deployment, the primary actuator serves primarily to control the speed of movement of the landing gear under the force of gravity towards the deployed position, the primary actuator also serving to drive the landing gear back towards the stowed position after use. A hinged stay serves to support the landing gear, when at its deployed position, and an over-centre hinged strut is typically provided to hold or lock the landing gear in its deployed position, a spring arrangement being used to drive the strut to its over-centre, locked position.

Due to the provision of the over-centre strut, the primary actuator is unable, alone, to drive the landing gear from its fully deployed position to its stowed position, and a secondary actuator is typically provided to drive the strut against the spring biasing thereof to its over-centre position, thereby releasing the locking effect of the over-centre strut and permitting the primary actuator, in conjunction with further movement of the secondary actuator, to then drive the landing gear to its stowed position.

In such an arrangement there is the risk that failure of the secondary actuator, resulting in jamming thereof, may prevent the strut from reaching its fully deployed, over-centre locked position, thus preventing the landing gear from being locked in its fully deployed position. Obviously, if the landing gear cannot be locked in its deployed position, the ability of the aircraft to undertake a safe landing may be impaired. It may also prevent stowing of the landing gear, but this is considered to be less problematic as, provided the landing gear is still able to return to, and be locked in, its fully deployed position, the aircraft is still able to land safely, whereon appropriate repairs to the landing gear can be undertaken.

SUMMARY OF THE INVENTION

It is an object of the invention to provide an actuator suitable for use as the secondary actuator in the arrangement outlined above, in which the risk of failure preventing locking of the landing gear in a fully deployed condition is reduced or minimised.

According to the present invention there is provided an actuator comprising an actuator shaft mounted for rotation by a drive shaft, releasable lock means operable to restrict axial movement of the actuator shaft relative to the drive shaft, and an output member cooperating with the actuator shaft such that rotation of the actuator shaft drives the output member for translating movement relative to the actuator shaft.

The actuator shaft may incorporate or be secured to a nut of the ball- or roller-screw type, the output member comprising a threaded shaft, rotation of the nut whilst the shaft is held against rotation causing axial movement of the shaft.

Where such an actuator is used as the secondary actuator in the application outlined hereinbefore, it will be appreciated that, in the event of a failure in the secondary actuator causing it to become jammed, release of the lock means permits axial movement of the actuator shaft, and thus axial movement of the output member associated therewith, thereby allowing the landing gear to be locked in its fully deployed position.

A motor is preferably arranged to drive the drive shaft, and hence the actuator shaft, for rotation. The drive shaft and actuator shaft are preferably splined to one another.

The drive shaft is preferably mounted for rotation and limited axial movement within a housing, a spring biasing arrangement, preferably in the form of a series of disc springs, biasing the drive shaft towards a predetermined axial position. Axial movement of the drive shaft beyond a release position conveniently permits release of the lock means, thereby enabling axial movement of the actuator shaft relative to the drive shaft.

The lock means preferably comprises a collar mounted upon the actuator shaft, the collar having a plurality of tines or fingers formed thereon. The tines preferably bear against a stop to limit radial outward movement thereof, and preferably also bear against a shoulder formed on the drive shaft to secure the actuator shaft against axial movement relative to the drive shaft.

In the event of the actuator becoming jammed, the loads applied thereto by the landing gear and primary actuator are sufficient to cause axial movement of the drive shaft, actuator shaft and collar beyond the release position, whereon the tines no longer bear against the stop, and the tines can deflect outwards, riding over the shoulder, and permitting separation of the actuator shaft from the drive shaft.

The shoulder is preferably of ramped form.

Preferably, the stop is moveable to a position in which the tines no longer bear against the stop. Conveniently, an actuator, for example in the form of an electromagnetic actuator, is provided to drive the stop for movement. Such an arrangement is advantageous in that the stop can be driven to a position in which outward deflection of the tines is permitted to allow axial movement of the actuator shaft relative to the drive shaft and housing, even when the load applied to the actuator is relatively low.

The collar is preferably slidably mounted upon the actuator shaft. Conveniently, the actuator shaft is provided with an abutment which is located between the collar and a series of inwardly extending projections, preferably ramped projections, formed on the tines. In use, jamming of the actuator during retraction thereof may result in the abutment causing the tines to bow outwardly, allowing the abutment to pass the projections, and permitting limited axial movement of the actuator shaft relative to the drive shaft and housing.

Sensors are preferably provided to permit monitoring of the operation of the actuator. For example, a sensor is preferably arranged to monitor the rotation or position of the drive shaft. In the event that the drive shaft is sensed to be rotating or in a position other than that corresponding to the rotation or second position of the primary actuator, an associated control system determines that a fault has occurred and the landing gear is moved back to its fully deployed position, and if necessary the lock means will be released in order to permit such movement.

The invention will further be described, by way of example, with reference to the accompanying drawings, in which:

DETAILED DESCRIPTION OF THE PREFERRED EMBODIMENT

Figure 1:
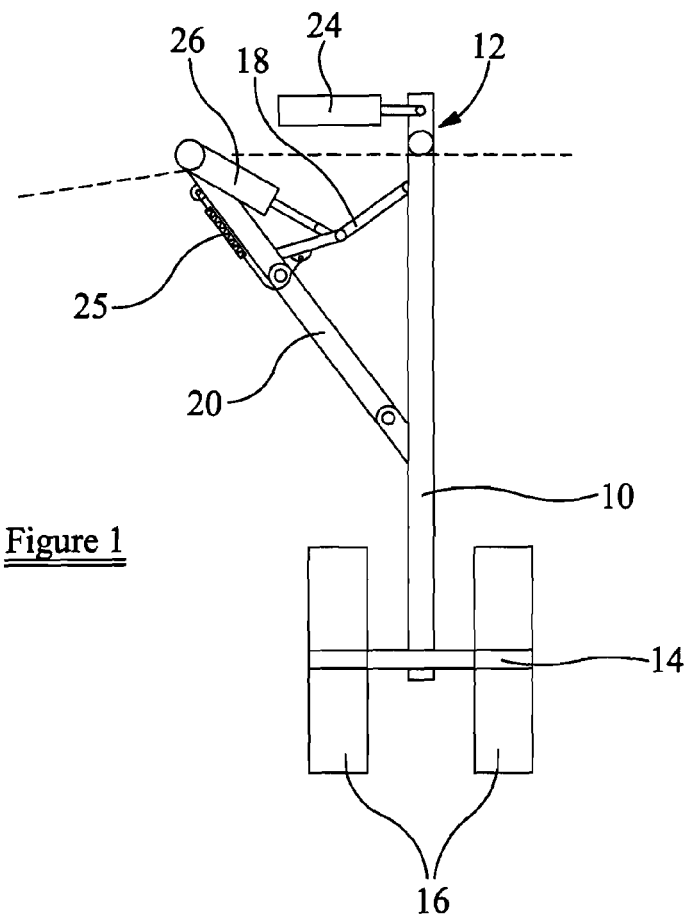
FIG. 1 is a view illustrating an aircraft landing gear and the associated primary and secondary actuators.

Referring firstly to FIG. 1 there is illustrated part of the landing gear of an aircraft. The landing gear comprises a support leg 10 which is moveable about a mounting 12 secured to the airframe of an aircraft between a stowed position and a deployed position. The support leg 10 carries, at its lower end, an axle 14 upon which wheels 16 are mounted. A hinged stay 20 is connected between the support leg 10 and the airframe, and a hinged strut arrangement 18 is connected between the stay 20 and the support leg 10. A primary actuator 24 is operable to drive the support leg 10 between its stowed position, in which the strut arrangement 18 is folded, and its deployed position. In moving between these positions, the strut arrangement 18 completely unfolds shortly before the fully deployed position is reached, and then flexes, slightly, in the opposite direction, as the fully deployed position is reached. The slight flexing of the strut arrangement 18 results in the strut arrangement 18 being of the over-centre type, the strut arrangement 18 serving, in use, to lock the support leg 10 in its deployed position. A powerful spring 25, which may be a coil spring as illustrated or, alternatively, may be a torsion spring, is provided to bias the strut arrangement 18 towards its over-centre, locked position.

Although the primary actuator 24 may be thought of as positively driving the support leg 10 both during deployment and stowing of the support leg 10, in practice, the weight of the landing gear is such that for the majority of the deployment operation, the primary actuator 24 serves as a brake, controlling the speed of deployment, rather than positively driving the support leg 10 towards its deployed position.

As the strut arrangement 18 is of the over-centre type, it will be appreciated that the primary actuator 24 alone cannot return the landing gear to its stowed position as to do this the strut arrangement 18 must be moved back beyond its completely unfolded, centre position and the primary actuator 24 which acts upon the support leg 10 is unable to drive the strut arrangement 18 in this manner. Rather, in addition to the primary actuator 24, a secondary actuator 26 is provided to drive the strut arrangement 18 against the action of the spring 25 biasing it to the over-centre position. Once the strut 18 has been moved out of the over-centre position, the primary actuator 24 is able to drive the landing gear to its stowed position.

As outlined hereinbefore, there is a concern with prior arrangements that failure or jamming of the secondary actuator 26 whilst the landing gear is being moved towards its deployed position may prevent the strut arrangement 18 from reaching its over-centre, locked position. Consequently, it may not be possible to lock the landing gear in its deployed position.

Figure 2:
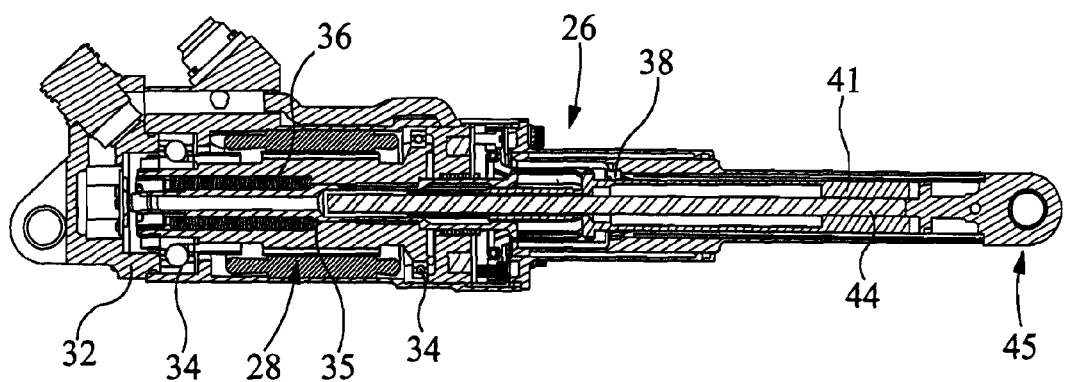
FIG. 2 is a sectional view illustrating the secondary actuator of the landing gear of FIG. 1, in accordance with one embodiment of the invention.
Figure 3:
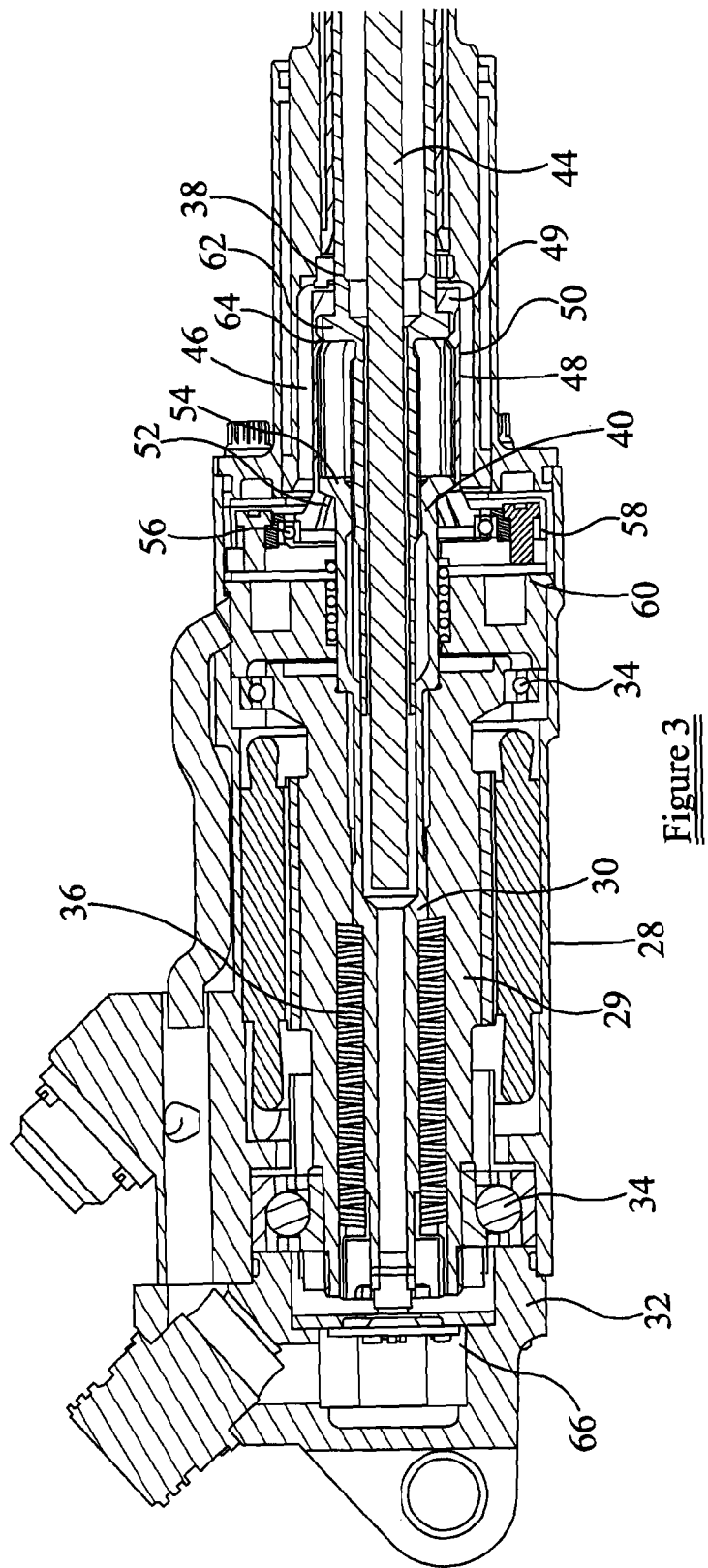
FIG. 3 is a sectional view illustrating part of the actuator of FIG. 2 in greater detail.

As shown in FIGS. 2 and 3, the secondary actuator 26 comprises an electrically powered motor 28 including a rotor 29 moveable to drive a drive shaft 30 for rotation. The rotor 29 of the motor 28 is supported for rotation relative to a housing 32 by bearings 34. A limited amount of axial movement of the drive shaft 30 is permitted relative to the rotor 29, and a series of disc springs 36 are provided therebetween to bias the drive shaft 30 towards a predetermined axial position relative to the rotor 29. A splined connection is provided between the rotor 29 of the motor 28 and the drive shaft 30 to transmit drive therebetween and to accommodate such axial movement.

A hollow actuator shaft 38 is splined to the drive shaft 30 by spline formations 40 such that the actuator shaft 38 is rotatable by the motor 28 and drive shaft 30, whilst being capable of axial sliding movement relative thereto. The actuator shaft 38 includes a nut 41 with which an output member 42 in the form of a threaded shaft 44 cooperates via a roller- or ball-screw type coupling such that rotation of the actuator shaft 38 and nut 41 causes the shaft 44 to translate relative to at least part of the actuator shaft 38. It will be appreciated, therefore, that operation of the motor 28 causes translational displacement of the output member 42, the direction of displacement being dependent upon the direction of rotation of the motor 28. The output member 42 is connected to the strut arrangement 18 to drive the strut arrangement 18 for movement as described hereinbefore.

The secondary actuator 26 further includes a releasable lock means 46 operable, in normal use, to substantially prevent axial movement of the actuator shaft 38 relative to the drive shaft 30. The lock means 46 comprises a collar 48 carried by the actuator shaft 38, the collar 48 including a flange region 49 and a series of fingers or tines 50, each of which extends in a direction substantially parallel to the axis of the actuator shaft 38, the tines 50 together forming a region of the collar 48 of generally split cylindrical form. The tines 50, at their free ends, include radially inwardly extending projections 52 which bear against a radially outwardly extending, ramped shoulder 54 formed on the drive shaft 30. The radially outer surfaces of the free ends of the tines 50 bear against an inner surface of a stop in the form of a bearing 56 of cylindrical form. The engagement between the tines 50 and the bearing 56 is such that the ends of the tines 50 are unable to deflect outwardly, thus locking the tines 50 in engagement with the shoulder 54 and so serving to resist axial movement of the actuator shaft 38 relative to the drive shaft 30.

The bearing 56 is mounted to the armature 58 of an electromagnetic actuator 60 which is operable to cause movement of the armature 58 and bearing 56 to a release position in which the tines 50 are disengaged from the bearing 56 and thus outward movement of the ends of the tines 50 is permitted.

The collar 48 is slidably mounted upon the actuator shaft 38. A shoulder 62 is formed on the actuator shaft 38, the shoulder 62 being sandwiched between the flange 49 and a series of radially inwardly extending ramped formations 64 provided on the tines 50 close to the flange 49.

A position sensor 66 monitors the rotary position of the drive shaft 30. The position sensor 66 may take any convenient form such as a shaft encoder or Hall effect sensor.

As set out above, in normal use, the actuator shaft 38 and drive shaft 30 are secured to one another by the lock means 46, and axial movement of the actuator shaft 38 relative to the drive shaft 30 is thus substantially prevented. During deployment of the landing gear, the primary actuator 24 serves to limit the deployment speed, and the secondary actuator 26 serves to control movement of the strut arrangement 18 to its fully unfolded position, and beyond its fully unfolded position to its slightly flexed, over-centre position. In this position, the landing gear is locked in its deployed position and is able to withstand large loadings urging it back towards its stowed position. From this position, in order to stow the landing gear, the secondary actuator 26 drives the strut arrangement 18, thereby ensuring that the strut arrangement 18 is driven to and beyond its fully unfolded position, thereby releasing the locking effect of the over-centre nature of the strut arrangement 18, ready for the primary actuator 24, to drive the landing gear to its stowed position.

In the event of the secondary actuator 26 failing and becoming jammed during the deployment operation, the tensile loading applied thereto by the weight of the landing gear and any force applied by the primary actuator 24, together, acting upon the linkage arrangement 18, will urge the actuator shaft 38 to the right, in the orientation illustrated. As the actuator shaft 38 and drive shaft 30 are locked to one another against axial movement by the lock means 46, this loading is transmitted to the drive shaft 30 and, by virtue of the sprung mounting of the drive shaft 30 within the housing 32, the drive shaft 30 and actuator shaft 38 are able to undergo limited axial movement. The limited axial movement results in the lock means 46 moving, axially, to a position in which the tines 50 no longer engage the bearing 56, outward deflection of the ends of the tines 50 then being permitted. The tines 50 are thus able to ride up and over the shoulder 54 of the drive shaft 30, thereby releasing the lock means 46 and allowing unrestricted axial movement of the actuator shaft 38. If necessary, the actuator shaft 38 may become totally disengaged from the drive shaft 30 during this movement. It will be appreciated that, in such circumstances, the jamming of the secondary actuator 26 does not inhibit the movement of the landing gear to its deployed position, although subsequent stowing of the landing gear will not be possible.

If the secondary actuator 26 becomes jammed when the landing gear is in a position in which the magnitude of the loading applied by the landing gear to the secondary actuator 26 is relatively low and insufficient to cause the drive shaft 30 to move against the action of the springs 36, for example as may be the case if the failure occurs as the landing gear approaches its fully deployed position, then automatic release of the locking means 46, as described hereinbefore, will not occur. In these circumstances, as soon as the failure of the actuator 26 has been sensed, for example as a result of a discrepancy between the outputs of the drive shaft position sensor 66 and the primary actuator position sensor or alternatively, from the output of a switch associated with the strut arrangement 18, then an associated control unit instructs energisation of the electromagnetic actuator 60, causing displacement of the armature 58 associated therewith, and of the bearing 56 mounted upon the armature 58 to the release position. The movement of the bearing 56 results in disengagement of the bearing 56 and free ends of the tines 50, thereby allowing the tines 50 to ride over the shoulder 54, releasing the lock means 46 and allowing unrestricted axial movement of the actuator shaft 38 which, as described hereinbefore, ensures that the secondary actuator 26 does not inhibit movement of the landing gear to its deployed, locked position.

If the secondary actuator 26 becomes jammed during stowing of the landing gear, this results in the actuator shaft 38 being urged to the left in the orientation illustrated. Continued operation of the primary actuator 24 will result in the compressive force experienced by the secondary actuator 26 being sufficient to force the shoulder 62 of the actuator shaft 38 into engagement with the ramped projections 64 of the tines 50, urging the tines 50 to bow outwards until a point is reached at which the shoulder 62 moves past the formations 64. It will be apparent that once this point has been reached, a degree of axial movement of the actuator shaft 38 is permitted, and the movement of the actuator shaft 38 through this distance will be sufficient to cause a discrepancy between the sensed drive shaft position and the sensed primary actuator position. This discrepancy is used to indicate that an actuator failure has occurred in the secondary actuator 26, whereon the stowing operation may be aborted and the landing gear driven, by the primary actuator 24, back to its deployed position. If the jamming of the secondary actuator 26 resists such redeployment of the landing gear, then release of the lock means 46 by either of the techniques described hereinbefore can be used to release the actuator shaft 38 for unrestricted axial movement, thereby ensuring that the failure of the secondary actuator 26 does not inhibit movement of the landing gear to the deployed position.

In this mode of operation it will be appreciated that the limited relative axial movement between the actuator shaft 38 and the drive shaft 30 permitted once the shoulder 62 has moved past the formations 64 reduces the risk of further damage being caused to the secondary actuator 26 prior to the stow operation being aborted.

It will be appreciated that although only a single embodiment of the invention is described hereinbefore, a wide range of modifications and alterations may be made thereto without departing from the scope of the invention.

The invention claimed is:

1. An actuator comprising an actuator shaft mounted for rotation by a drive shaft, a releasable lock operable to restrict axial movement of the actuator shaft relative to the drive shaft, the lock comprising a plurality of radially moveable tines, moveable between a locked position in which they secure the drive shaft and the actuator shaft to one another and an unlocked position in which the lock automatically releases in the event that a predetermined load is applied to the actuator, and an output member co-operating with the actuator shaft such that rotation of the actuator shaft drives the output member for translating movement relative to the actuator shaft, wherein the drive shaft is mounted for rotation and restricted axial movement within a housing, a spring biasing arrangement biasing the drive shaft towards a predetermined axial position, the tines co-operating with a stop to prevent radial movement of the tines to the unlocked position when the drive shaft occupies the predetermined axial position, axial movement of the drive shaft in unison with the actuator shaft through a limited distance in response to the predetermined load beyond a release position causing axial movement of the tines relative to the stop to a position in which the tines no longer co-operate with the stop and permitting radial movement of the tines to release the lock and thereby enable axial movement of the actuator shaft relative to the drive shaft.

2. An actuator according to claim 1, wherein the actuator shaft incorporates or is secured to a nut, the output member comprising a threaded shaft, rotation of the nut while the threaded shaft is held against rotation causing axial movement of the threaded shaft.

3. An actuator according to claim 1, further comprising a motor arranged to drive the drive shaft, and hence the actuator shaft, for rotation.

4. An actuator according to claim 1, wherein the drive shaft and actuator shaft are splined to one another.

5. An actuator according to claim 1, wherein the lock comprises a collar mounted upon the actuator shaft, the collar having the plurality of tines formed thereon.

6. An actuator according to claim 5, wherein, the tines also bear against a shoulder formed on the drive shaft to secure the actuator shaft against axial movement relative to the drive shaft.

7. An actuator according to claim 6, wherein the shoulder is of ramped form.

8. An actuator according to claim 6, wherein the stop is movable to a position in which the tines no longer engage the stop.

9. An actuator according to claim 8, wherein an electromagnetic actuator is provided to drive the stop for movement.

10. An actuator according to claim 5, wherein the collar is slidably mounted upon the actuator shaft.

11. An actuator according to claim 10, wherein the actuator shaft is provided with an abutment which is located between the collar and a series of inwardly extending projections formed on the tines.

12. An actuator according to claim 11, wherein the inwardly extending projections are of ramped form.

13. An actuator according to claim 1, further comprising at least one sensor arranged to monitor an operating characteristic of the actuator.

* * * * *